Patented Oct. 26, 1948

2,452,054

UNITED STATES PATENT OFFICE 2,452,054

FIRE-RETARDANT COMPOSITION AND PROCESS

Grinnell Jones, Cambridge, Walter Juda, Belmont, and Samuel Soll, Boston, Mass., assignors, by mesne assignments, to Albi Manufacturing Co., Incorporated, a corporation of Connecticut No Drawing. Application June 20, 1944, Serial No. 541,297

20 Claims. (Cl. 260—17.3)

1

The present invention relates to a fire-retardant and potentially heat-insulating composition and has for its object the provision of an improved composition of this character.

The composition of our invention may be applied as a surface coating to combustible materials including wood, cellulosic wallboard, paper, cardboard, and the like, where its fire-retarding and potentially heat-insulating properties will be useful, as well as to non-combustible materials including metals, gypsum wallboard and the like, where its potentially heat-insulating properties will be useful.

Numerous prior proposals have been made for the protection of wood against fire. It is known that certain chemicals, for example ammonium phosphate, borax and others, have some fire-retarding action. Efforts have been made to enhance the effectiveness of these chemicals by vacuum and pressure tank impregnation of the wood, or by the use of small amounts of adhesives and thickening agents such as alginic acid and alginates, glue, dextrin or starch to increase the thickness of the surface coating. The use of resins formed from formaldehyde and dicyandiamide and from ethylidene urea has also been suggested. Thick coatings of non-combustible matter such as asbestos, silica, clay, gypsum or sodium silicate have also been suggested. All of these proposals have fallen short of achieving the desired objectives.

In accordance with our invention we apply to the surface of wood or other combustible materials, or non-combustible materials, a layer of chemicals which is adherent, stable and potentially reactive and which when subjected to heat is promptly puffed up into a relatively thick carbonaceous foam. This foam is itself practically incombustible and it acts as a heat-insulating and fire-resistant protection for the treated surface.

One type of composition according to our invention, comprises ingredients capable of forming a resinous carbonific or carbon-yielding substance, a non-resinous carbonific, and a spumific or foam-producing substance.

As the ingredients capable of forming the resinous carbonific we use a mixture of urea and a source of formaldehyde such as paraformaldehyde, hexamethylenetetramine or the like. Or we may use a preformed urea-formaldehyde resin.

2

This resinous carbonific is convertible into a fire-resistant carbonaceous foam by the action of the spumific at a temperature of 140° C. or higher. The resinous carbonific, namely urea-formaldehyde resin, not only serves as a source of carbon but also acts as an adhesive and hydrophobe.

We have found that the addition of a non-resinous carbonific to the composition containing a spumific and the urea-formaldehyde resin gives a more coherent carbonaceous foam of a finer texture than that obtainable from a composition containing no non-resinous carbonific. The three-component mixture is, therefore, superior and preferred, although usable two-component mixtures of urea-formaldehyde resin and spumific can be obtained by the choice of suitable proportions.

As the non-resinous carbonific, we may use any solid non-resinous carbonaceous substance which in the presence of the spumific and at elevated temperatures, for example 300° C. or higher, will be converted into carbon rather than volatilized. Preferably, the non-resinous carbonific should be a substance which does not melt at the temperature of combustion of wood and which can be suspended, dispersed or dissolved in aqueous media. While starch is a preferred carbonific, carbohydrates generally and proteins are suitable materials. Specific mention, by way of example, may be made of dextrin, carbohydrate gums, modified starches, and like substances. It will be noted that these carbonifics by themselves are combustible.

As the spumific, we use a chemical or chemicals which will convert the carbonific into a foam-like, puffed-up layer resistant to combustion. Specific examples of such chemicals include monoammonium phosphate, diammonium phosphate, phosphoric acid, ammonium sulfate, sulfamic acid, ammonium sulfamate, ammonium bromide, sodium tungstate, sodium borate and boric acid.

Since some carbonifics have a tendency to ferment and since some spumifics favor this fermentation and the growth of fungi, we sometimes find it advantageous to include in our composition a fungicide and/or bactericide. Suitable substances for this purpose include sodium pentachlorphenol, beta naphthol, copper fluoride and other copper salts, boric acid, borax, zinc salts, fluorides, arsenates, arsenites, and the like.

A swelling agent such as gum tragacanth, gum arabic, Irish moss, and the like, is sometimes advantageous. It helps to provide a satisfactory suspension of all of the ingredients in water and yields a liquid composition of good body.

Pigments, dyes, or other coloring materials may be added if desired.

The composition may be made in the form of a solid, a liquid or a paste. For ease of application, it is generally convenient to apply it to the surface to be treated in a solution or suspended or emulsified in a liquid medium. Water is generally the cheapest suitable vehicle. Drying-oil paint vehicles or other non-aqueous vehicles may also be used, particularly when it is desired to obtain improved water-resistance.

Compositions made with urea and aqueous formaldehyde solutions in the presence of monoammonium phosphate tend to give a coating having good resistance to moisture. Such compositions tend to polymerize rapidly, which may be disadvantageous in some specific applications. In the presence of diammonium phosphate, these compositions polymerize slowly, which is sometimes an advantage, but they possess less moisture resistance than the compositions containing monoammonium phosphate.

By replacing the aqueous formaldehyde solutions with paraformaldehyde and water, the formation and hardening of the resin by polymerization in the liquid composition is considerably delayed. The advantageous moisture-resistant properties of mixtures containing monoammonium phosphate are substantially retained when the aqueous formaldehyde solution is replaced by paraformaldehyde.

A mixture containing all of the ingredients except the paraformaldehyde is stable in a dry condition. The paraformaldehyde may be separately packaged and mixed with the other ingredients at the time of use. When the mixture is dispersed in water, a liquid composition of good painting qualities is obtained, which will remain liquid without significant thickening for more than six hours at ordinary temperatures. After application the coating dries by evaporation of the water and becomes hard and more resistant to moisture by the progressive polymerization of the urea-formaldehyde resin.

The molecular ratio of formaldehyde to urea may be between 1 and 2.5 moles formaldehyde to 1 mole urea, the preferred range being 1.5 to 1.7 moles formaldehyde to 1 mole urea.

An example of a preferred composition falling within the scope of our invention is as follows:

Example 1

| | Parts |
|---|---|
| Paraformaldehyde | 12 |
| Monoammonium phosphate | 67 |
| Urea | 15 |
| Starch | 8 |

In addition the following may be added if desired:

| | Parts |
|---|---|
| Titanium-barium pigment | 4 |
| Boric acid | 2 |
| Tragacanth gum | 1 |

The paraformaldehyde is kept in a separate container. The other ingredients are well mixed and ground. Before use, the paraformaldehyde is mixed with the other ingredients and 50 parts of water are added. A liquid composition of good painting qualities is thus obtained. It is allowed to stand for one-half hour before use.

Other examples of compositions according to our invention are as follows:

Example 2

| | Parts |
|---|---|
| Diammonium phosphate | 160 |
| Urea | 96 |
| Dextrin | 50 |
| Water | 100 |

(This mixture is not reactive; it is stable on storage.)

| | |
|---|---|
| Aqueous formaldehyde solution (37%) (to be kept separately) | 300 |

The aqueous formaldehyde is added before use to the other ingredients, with stirring. The mixture will heat and should be allowed to cool.

Example 3

| | Parts |
|---|---|
| Monoammonium phosphate | 70 |
| Urea | 16 |
| Starch | 8 |
| Tragacanth gum | 0.8 |
| Pigment | 4 |
| Water | 30 |

(This mixture is not reactive; it is stable on storage.)

| | |
|---|---|
| Aqueous formaldehyde (37%) (to be kept separately) | 32.5 |

The aqueous formaldehyde is added before use to the other ingredients with stirring. The resulting composition will heat slowly. It is allowed to cool before it is applied.

The following is an example of a composition containing a preformed urea-formaldehyde resin:

Example 4

| | | |
|---|---|---|
| Diammonium phosphate | grams | 65 |
| Dextrin | do | 25 |
| Urea-formaldehyde resin (Beetle No. 250V) | do | 32 |
| Water | cc | 120 |

When a preformed urea-formaldehyde resin is used, it is often advantageous to store it separately, either in aqueous solution or in water-soluble solid form.

In general we prefer to store and supply our compositions in the form of two separate fractions which are stable, but which are potentially reactive in the sense that they react when they are mixed in the presence of water. Often the humidity of the air is sufficient to initiate the reaction in a mix containing all ingredients in solid form. However, it is possible to prepare compositions of good stability containing all ingredients in a single mix, for example by using preformed, partially polymerized resins, or by using completely polymerized resins together with an additional binding ingredients such as glue or a drying oil or a resin, or by using solid ingredients and keeping them thoroughly dry, or by using non-aqueous vehicles. The shelf life of liquid compositions containing the partially polymerized resin may be prolonged by adding comparatively small amounts of an alcohol, such as ethyl alcohol, isopropyl alcohol or the like.

For some purposes, the non-resinous carbonific may be omitted from our composition. An example of a simple composition of this type is the following:

Example 5

| | Parts |
|---|---|
| Monoammonium phosphate | 65 |
| Urea | 15 |
| Water | 60 |
| Paraformaldehyde (to be kept separately) | 15 |

At temperatures of 140° C. and above, the spumific causes the resinous carbonific to form the voluminous heat-insulating carbonaceous foam. The carbon in this foam is itself rendered practically incombustible by the spumific or by decomposition products of the spumific provided that proper proportions of carbonific and spumific are used. However, if an excessive proportion of the carbonific is used the spumific is no longer capable of interacting with the carbonific to the same extent and a substantial loss in fire-resisting properties may result. On the other hand, if an excess of spumific is used the composition does not contain adequate amounts of carbon to form a large volume of foam and again a loss in heat-insulating and fire-resisting properties is observed.

In compositions of the type of Example 5, containing a spumific and urea-formaldehyde resin, but no non-resinous carbonific, the ratio between the resin and the spumific should be 0.2 to 0.7 part resin to one part spumific.

In the case of our preferred composition containing both the resin and the non-resinous carbonific, these two ingredients together should total at least 25% of the weight of the spumific present, but should not exceed the weight of the spumific.

The combined spumific, urea-formaldehyde resin and non-resinous carbonific (if the latter is present) should not be less than 25% of the liquid composition. We prefer compositions containing 50 to 75% of these combined ingredients.

It is also possible to prepare useful fire-retardant non-aqueous compositions containing a spumific, for example ammonium phosphate, urea-formaldehyde resin and preferably, but not necessarily, a non-resinous carbonific, for example starch, and a non-aqueous vehicle, for example a drying oil. Compositions of this type may be made by merely mixing the solid ingredients and dispersing them in the oil. Or they may be made by preparing the urea-formaldehyde polymer from urea and a solid source of formaldehyde for example paraformaldehyde, in the presence of the proper amounts of the spumific and the carbonific; the resulting dry mix may then be ground to any desired mesh and suspended in drying-oil paint vehicles or in other non-aqueous vehicles. Similar compositions containing aqueous formaldehyde as the source of formaldehyde, may be emulsified in drying-oil or other non-aqueous vehicles.

Compositions of this type have the advantage that they are less influenced by water or high humidity than compositions applied from an aqueous vehicle. But their fire-resistance is somewhat decreased by the presence of the drying oil. In view of the improvement in water- and moisture-repellence, somewhat decreased fire-retardance in the product will be acceptable for some uses. Therefore other resins, for example melamine-formaldehyde or phenol-formaldehyde resins, may comprise, or be included in, the resinous carbonific ingredient of this type of composition.

The following is an example of a composition suspended in a drying oil paint vehicle:

*Example 6*

The ingredients of Composition 1 are mixed with constant stirring at a moderate temperature, for example 70° C., until the resin is thoroughly polymerized. The mix is then dried and ground to, say, 200 mesh. 350 parts of this composition may then be suspended in the following paint vehicle:

| | Parts |
|---|---|
| Gloss oil | 80 |
| Dehydrated castor oil | 25 |
| Pigment | 20 |
| Thinner | 115 |
| Cobalt drier | 1 |
| Linseed oil fatty acids | 15 |

Our compositions are suitable for application to copper, brass, and tin without danger of corrosion. However, one of the most important applications for heat-insulating is on steel and here the acid nature of monoammonium phosphate in the preferred composition causes corrosion. If the monoammonium phosphate is replaced by diammonium phosphate the iron is not corroded. However, since the monoammonium phosphate accelerates the hardening of the resin more than the diammonium phosphate does, we prefer it to diammonium phosphate. To prevent corrosion of the steel we may add a small percentage of a passivator or substance capable of rendering the iron passive, for example sodium dichromate, as in the following example.

*Example 7*

| | Parts |
|---|---|
| Monoammonium phosphate | 67 |
| Urea | 15 |
| Starch | 8 |
| Titanium-barium pigment | 4 |
| Boric acid | 2 |
| Tragacanth gum | 1 |
| Sodium dichromate | 1 to 2 |
| Paraformaldehyde | 12 |

An alternative method to prevent attack on steel is to wash the steel with a solution capable of rendering the iron passive, for example, a sodium dichromate solution, and then apply the regular composition given in Example 1. Another alternative is to apply a primer coat to the steel, for example a paint containing a drying oil and red lead as pigment.

The puffed-up, foam-like carbon layer formed by the composition of our invention may function as a fire-retardant in a number of ways. It acts as an efficient heat-insulator and thereby retards the transmission of heat from an incendiary source to the combustible material being protected. It may adsorb combustible vapors and gases such as methane or acetone which are formed by the destructive distillation of wood in direct contact with the flame. It may also adsorb non-combustible gases such as carbon dioxide and nitrogen and thereby interfere with the ignition of the combustible gases. Owing to its finely divided, porous condition, it may also help to prevent access of oxygen to the wood. The carbonaceous layer itself is resistant to combustion due to the presence or action of the spumific.

Our composition may be applied to wood, metal, paper or other materials in any convenient manner, as by brushing, spraying or dipping.

The present application is a continuation in part of our co-pending application Ser. No. 455,346, filed August 19, 1942.

Having thus described our invention, we claim:

1. A potentially reactive fire-retardant composition comprising urea, a source of formaldehyde, a carbohydrate and a foam-forming ingredient selected from the group consisting of monoammonium phosphate, diammonium phosphate, phosphoric acid, ammonium sulfate, sulfamic acid, ammonium sulfamate, ammonium bromide, sodium tungstate, sodium borate and boric acid, the formaldehyde available from said source being present in a ratio between 1 and 2.5 moles per mole of urea, the urea and formaldehyde available from said source being present in amount between 20% and 70% of the weight of the foam-forming ingredient, the carbohydrate being present in amount not less than 5% of the foam-forming ingredient and the combined weight of the carbohydrate, the urea and the formaldehyde available from said source not exceeding the weight of the foam-forming ingredient.

2. A composition as claimed in claim 1 wherein the source of formaldehyde is paraformaldehyde.

3. A composition as claimed in claim 1 wherein the source of formaldehyde is hexamethylenetetramine.

4. A composition as claimed in claim 1 wherein the carbohydrate is starch.

5. A composition as claimed in claim 1 wherein the source of formaldehyde is paraformaldehyde, the foam-forming ingredient is monoammonium phosphate and the carbohydrate is starch.

6. A composition as claimed in claim 1 wherein the urea, the source of formaldehyde, the carbohydrate, and the foam-forming ingredient are in finely-divided solid admixture.

7. A potentially reactive fire-retardant composition comprising urea, a source of formaldehyde, starch and a foam-forming ingredient selected from the group consisting of monoammonium phosphate, diammonium phosphate, phosphoric acid, ammonium sulfate, sulfamic acid, ammonium sulfamate, ammonium bromide, sodium tungstate, sodium borate and boric acid, the formaldehyde available from said source being present in a ratio between 1 and 2.5 moles per mole of urea, the urea and formaldehyde available from said source being present in amount between 20% and 70% of the weight of the foam-forming ingredient, the starch being present in amount of 11% by weight of the foam-forming ingredient.

8. A potentially reactive fire-retardant composition comprising a mixture of the following ingredients in the following proportions by weight:

| | Parts |
|---|---|
| Urea | 15 |
| Paraformaldehyde | 12 |
| Monoammonium phosphate | 67 |
| Starch | 8 |

9. A fire-retardant composition comprising a reacting aqueous mixture of urea, a source of formaldehyde, a carbohydrate and a foam-forming ingredient selected from the group consisting of monoammonium phosphate, diammonium phosphate, phosphoric acid, ammonium sulfate, sulfamic acid, ammonium sulfamate, ammonium bromide, sodium tungstate, sodium borate and boric acid, the formaldehyde available from said source being present in a ratio between 1 and 2.5 moles per mole of urea, the urea and formaldehyde available from said source being present in amount between 20% and 70% of the weight of the foam-forming ingredient, the carbohydrate being present in amount not less than 5% of the foam-forming ingredient and the combined weight of the carbohydrate, the urea and the formaldehyde available from said source not exceeding the weight of the foam-forming ingredient.

10. A composition as claimed in claim 9 wherein the urea, the formaldehyde available from said source, the carbohydrate and the foam-forming ingredient constitute 25% to 75% by weight of the aqueous mixture.

11. A composition as claimed in claim 9 wherein the urea, the formaldehyde available from said source, the carbohydrate and the foam-forming ingredient constitute 50% to 75% by weight of the aqueous mixture.

12. A method of forming a fire-retardant surface coating which comprises mixing together urea, a carbohydrate, a foam-forming ingredient selected from the group consisting of monoammonium phosphate, diammonium phosphate, phosphoric acid, ammonium sulfate, sulfamic acid, ammonium sulfamate, ammonium bromide, sodium tungstate, sodium borate and boric acid, a source of formaldehyde, and water, the formaldehyde available from said source being present in a ratio between 1 and 2.5 moles per mole of urea, the urea and formaldehyde available from said source being present in amount between 20% and 70% of the weight of the foam-forming ingredient, the carbohydrate being present in amount not less than 5% of the foam-forming ingredient and the combined weight of the carbohydrate, the urea and the formaldehyde available from said source not exceeding the weight of the foam-forming ingredient, and applying the aqueous composition to the surface to be coated.

13. The method as claimed in claim 12 wherein the urea, the formaldehyde available from said source, the carbohydrate and the foam-forming ingredient constitute 50% to 75% by weight of the aqueous composition.

14. The method as claimed in claim 12 wherein the water is added to a solid mixture of the other named ingredients.

15. A method of forming a fire-retardant surface coating which comprises mixing together urea, starch, ammonium phosphate, paraformaldehyde and water, the paraformaldehyde being present in a ratio between 1 and 2.5 moles per mole of urea, the urea and paraformaldehyde being present in amount between 20% and 70% of the weight of the ammonium phosphate, the starch being present in amount not less than 5% of the ammonium phosphate, and the combined weight of the starch, the urea and the paraformaldehyde not exceeding the weight of the ammonium phosphate, and applying the aqueous composition to the surface to be coated.

16. A fire-retardent composition comprising a mixture of a carbohydrate, a foam-forming ingredient selected from the group consisting of monoammonium phosphate, diammonium phosphate, phosphoric acid, ammonium sulfate, sulfamic acid, ammonium sulfamate, ammonium bromide, sodium tungstate, sodium borate and boric acid, and a binder selected from the group consisting of urea-formaldehyde resin made by condensing urea and a source of formaldehyde in a ratio between 1 and 2.5 moles of formaldehyde per mole of urea, and urea-formaldehyde resin forming compounds, said compounds being urea and a source of formaldehyde, in a ratio between 1 and 2.5 moles of formaldehyde per mole of urea, said binder being present in amount between 20% and 70% of the weight of the foam-forming ingredient, the carbohydrate being present in amount not less than 5% of the foam-forming ingredient, and the combined weight of the carbohydrate and the binder not exceeding the weight of the foam-forming ingredient, said mixture being suspended in a liquid in concentration between 25% and 75% by weight of the resulting liquid composition.

17. A composition as claimed in claim 16 wherein the liquid is water and the concentration of said mixture in said water is between 50% and 75% of the aqueous composition.

18. A fire retardant composition comprising a mixture of carbohydrate, a foam-forming ingredient selected from the group consisting of monoammonium phosphate, diammonium phosphate, phosphoric acid, ammonium sulfate, sulfamic acid, ammonium sulfamate, ammonium bromide, sodium tungstate, sodium borate and boric acid, and urea-formaldehyde resin made by condensing urea and a source of formaldehyde in a ratio between 1 and 2.5 moles of formaldehyde per mole of urea, said resin being present in an amount between 20% and 70% of the weight of the foam-forming ingredient, the carbohydrate being present in amount not less than 5% of the foam-forming ingredient and the combined weight of the carbohydrate and the resin not exceeding the weight of the foam-forming ingredient, said mixture being suspended in a liquid in concentration between 25% and 75% by weight of the resulting liquid composition.

19. A fire-retardant, water-resistant, and potentially heat-insulating composition comprising a urea-formaldehyde resin made by condensing urea and a source of formaldehyde in a ratio between 1 and 2.5 moles of formaldehyde per mole of urea, an inorganic foam-forming ingredient selected from the group consisting of monoammonium phosphate, diammonium phosphate, phosphoric acid, ammonium sulfate, sulfamic acid, ammonium sulfamate, ammonium bromide, sodium tungstate, sodium borate, boric acid, and a carbohydrate present in amount not less than 5% by weight of the foam-forming ingredient, said resin being present in an amount between 20% and 70% of the weight of the foam-forming ingredient and the combined weight of the carbohydrate and resin not exceeding the weight of the foam-forming ingredient, said composition being suspended in a non-aqueous paint vehicle.

20. A composition as claimed in claim 19 wherein the non-aqueous paint vehicle comprises dehydrated castor oil, gloss oil, and a drier.

GRINNELL JONES.
WALTER JUDA.
SAMUEL SOLL.

REFERENCES CITED

The following references are of record in the file of this patent:

UNITED STATES PATENTS

| Number | Name | Date |
|---|---|---|
| 271,995 | Siulliot | Feb. 6, 1883 |
| 1,856,756 | Fugiola | May 3, 1932 |
| 2,019,834 | Vierling | Nov. 5, 1935 |
| 2,033,411 | Carson | Mar. 10, 1936 |
| 2,106,938 | Tramm | Feb. 1, 1938 |
| 2,275,314 | Pierson | Mar. 3, 1942 |
| 2,302,309 | Glarum | Nov. 17, 1942 |
| 2,329,051 | Hunsicker | Sept. 7, 1943 |
| 2,377,867 | D'Alelio | June 12, 1945 |

FOREIGN PATENTS

| Number | Country | Date |
|---|---|---|
| 334,408 | Great Britain | Sept. 4, 1930 |
| 435,240 | Great Britain | Sept. 17, 1935 |